No. 790,313. PATENTED MAY 23, 1905.
T. REDMAN.
CENTER VALVE.
APPLICATION FILED NOV. 18, 1904.

2 SHEETS—SHEET 1.

Attest:
C. S. Middleton
A. M. Tanner

Inventor
Thomas Redman
by Spear Middleton Donaldson Spear
Attys

No. 790,313. PATENTED MAY 23, 1905.
T. REDMAN.
CENTER VALVE.
APPLICATION FILED NOV. 18, 1904.

2 SHEETS—SHEET 2.

Attest:
S. Middleton
A. M. Tanner

Inventor:
Thomas Redman.
By Spear Middleton Donaldson & Spear
Attys

No. 790,313.

Patented May 23, 1905.

UNITED STATES PATENT OFFICE.

THOMAS REDMAN, OF BOLTON, BRADFORD, ENGLAND.

CENTER VALVE.

SPECIFICATION forming part of Letters Patent No. 790,313, dated May 23, 1905.

Application filed November 18, 1904. Serial No. 233,343.

*To all whom it may concern:*

Be it known that I, THOMAS REDMAN, a subject of the King of Great Britain and Ireland, and a resident of The Priory, Bolton, Bradford, in the county of York, England, have invented certain Improvements in Center Gas-Valves, (for which I have made application for a patent in Great Britain, numbered 12,658, dated June 4, 1904,) of which the following is a specification.

This invention has for its object the construction of what are known as "center valves" used in connection with the purification of gas; and it consists in arranging and combining the several parts comprising the valve in such a manner that the valve is applicable for controlling the flow of gas, so as to pass through the whole series of gas-purifying boxes or through some of the series of boxes with which the valve is connected and to finally deliver the volume of gas to the trunk main or other range of pipes, accomplished by a combination of parts arranged so as to dispense with the "seal-pot well" or with what is sometimes called the "siphon-sealed" portion of such valves found necessary with center valves when constructed in the manner as hitherto.

In describing my invention in detail reference is made to the accompanying drawings, in which—

Figure 1:
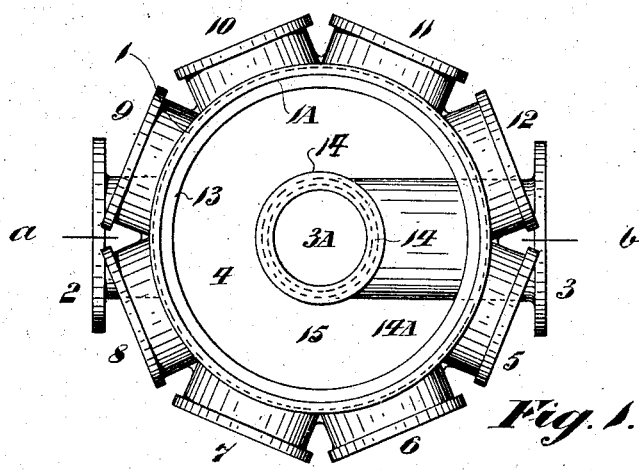
Figure 2:
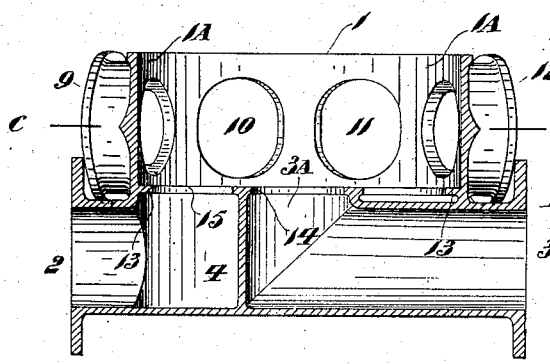
Figure 3:
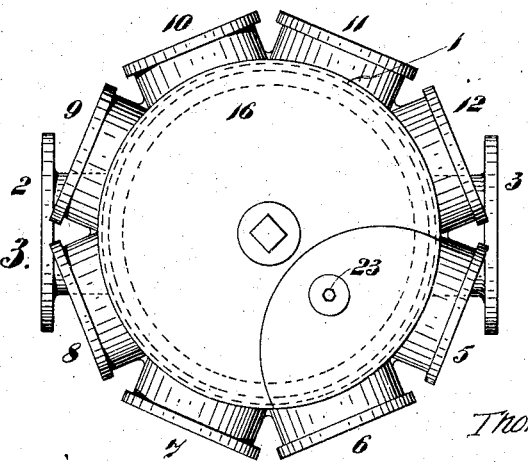
Figure 4:
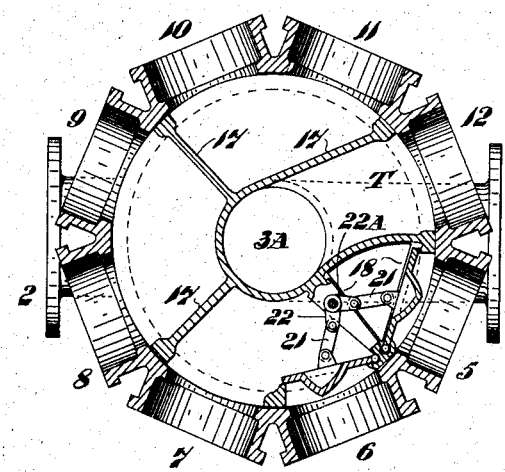
Figure 5:
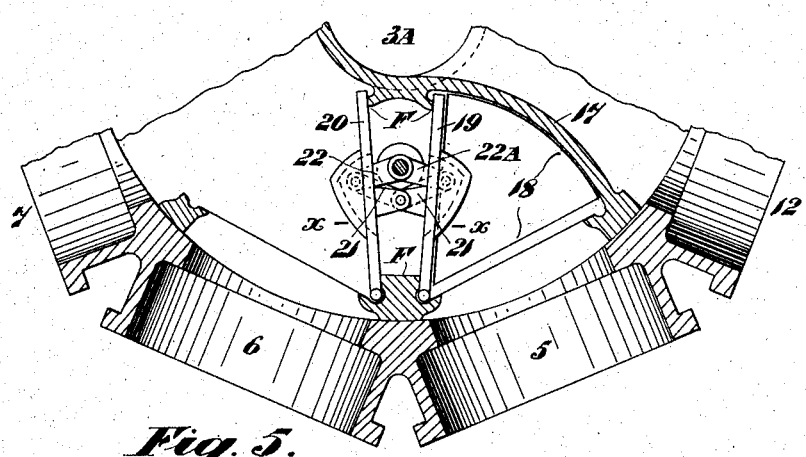
Figure 6:
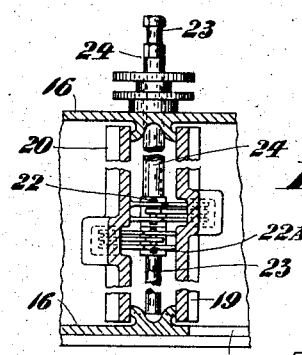

Figure 1 represents a plan of the outer or fixed casing of a center valve constructed in accordance with my invention, showing the branches for making connections with the trunk main or supply range of pipes and with top branches for making pipe connections with the inlet and outlet openings of gas-purifying boxes. Fig. 2 is a section through line *a b*. Fig. 3 is a similar plan to Fig. 1, but provided with the center or rotating portion of valve placed in position. Fig. 4 is a sectional plan through line *c d*. Fig. 5 is a detached sectional plan of a portion of the center or rotating part of the valve, along with a portion of the outer or fixed casing, drawn to an enlarged scale; and Fig 6, a detached detail through line *x x* of Fig. 5, showing the link connections between the spindle and sleeve adapted for operating the wing valve-plates, also drawn to an enlarged scale.

In carrying out my invention I form an outer casing 1 with branches 2 and 3 for attachment to what is commonly termed the "trunk main line of pipes" arranged in the ordinary manner. The branch 2 communicates with an annular space 4 within the bottom portion of said casing. The other branch, 3, extends internally in pipe form and terminates with an opening $3^A$ in the center.

The fixed or outer casing 1 is provided with top branches 5, 6, 7, 8, 9, 10, 11, and 12 for pipe connections thereto. Each pair of branches following in numerical order is connected to the inlet and outlet pipes, respectively, of a gas-purifying box. The center valve shown having eight top branches numbered as above is suitable for attachment to four purifying-boxes and controlling the flow of gas through same. The attachments between branches and purifying-boxes are made by pipe connections in the ordinary manner.

Within the outer casing 1 are two flanged ring-supports 13 and 14, leaving a concentric opening 15 between same. These supports are machined, as is also the internal circumference at $1^A$ of casing 1, and upon the said flanged ring-supports rests an internal circular casing 16, machined to fit the circular opening within the circumference $1^A$ of outer casing and adapted to be rotated therein.

The internal circular rotary casing is divided by vanes 17 into a number of compartments suitably covered by a top plate, the number of compartments corresponding to the pairs of top branches 5 to 12 and attached purifying-boxes.

One of the before-mentioned compartments has an opening 18, formed through the bottom plate of casing, communicating with the annular space 4 below. This compartment is divided from the next by a perforated vane prepared with a flat valve-facing on each side at F F for the reception of wing-plate valves 19 and 20, one of which is mounted on each side of said vane for the purpose of controlling the gas-current passing through the valve.

The wing valve-plates are pivoted at one end, and each is connected by a link 21 to its respective lever 22 or 22ᴬ, one of which is secured to spindle 23 and the other to sleeve 24, incasing a portion of said spindle, both extending through the cover-plate of internal casing 16, both spindle and sleeve terminating with a square or other suitably-shaped end adapted for engagement with a key-lever for operating the wing valve-plates coupled thereto.

By turning the circular casing 16 into a definite position, such as shown by Fig. 5, with the wing valve-plates 19 and 20 in contact with the valve-facings F F, the gas on passing from annular space 4 through opening 18 in bottom plate into the compartment with which branch 5 is definitely connected is allowed to flow from said compartment through branch 5 and ordinary pipe connections to a purifying-box, through which it passes in the ordinary manner, returning to the interior of rotary casing 16 through branch 6 into the compartment with which branch 7 forms a part, the gas escaping through branch 7 to another purifier, from which it returns to center valve through branch 8. The flow of gas is continued in the same manner through the rest of purifying-boxes connected with the remaining top branches 9 to 12 and finally escapes through branch 12 along thoroughfare T to center opening 3ᴬ, communicating with branch 3, which may be connected to the trunk main or other range of pipes, as is the case with center valves of the ordinary description.

When the wing-plate valves 19 and 20 are in the position as shown and described in connection with Fig. 5, gas is allowed to flow through the whole series of four purifying-boxes; but any one box of the series of four may be cut off and the gas passed through the remaining three purifying-boxes only. This is accomplished by moving the wing-plate valves 19 and 20 to the position shown by Fig. 4. In this case the gas still entering casing 16 through opening 18 from annular space 4 is diverted from branch 5 and controlled so as to flow through branch 7. The gas continuing its course through the remainder of purifying-boxes in rotation finally escapes through branch 12 to the center opening 3ᴬ, connected with branch 3.

It will be obvious from the foregoing description that by turning the internal casing 16 into another position, so that the opening 18 is opposite any of the top outflow branches indicated by the odd numerals, and placing the wing-plate valves 19 and 20 in the position shown by Fig. 4 any of the purifying-boxes may be shut off from connection with the center valve for the purpose of examination, recharging, repairs, or the like and the remaining three boxes kept in use for purifying purposes, the gas always finally returning through one of the top branches having an even reference-number into the thoroughfare T, communicating with before-mentioned opening 3ᴬ.

By constructing center valves in the manner described the gas is controlled and passed through the valve in a way so as to render siphon sealing unnecessary, the valve being so arranged as to allow the gas to flow direct through selected compartments and purifying-boxes or through the whole or a portion of the valve.

What I claim as my invention is—

1. In center valves a fixed outer casing having an annular space and concentric opening combined with a rotary casing divided by vanes into compartments and provided with wing-plate valves adapted to direct the flow of gas substantially as described.

2. In center valves a fixed casing with inlet into an annular space a concentric opening at top of same an inlet from annular space into a compartment of rotary-casing wing-plate valves and perforated vane combined with unperforated vanes and outlet-pipe substantially as described.

3. In center valves a fixed casing adapted to deliver gas to an opening through an upper casing in all positions of rotation, wing-plate valves adapted to be operated and combined with said opening, perforated vane and with outlet and inlet branches of fixed casing substantially as shown and described.

In witness whereof I have hereunto set my hand in the presence of two witnesses.

THOMAS REDMAN.

Witnesses:
RALPH REDMAN,
JOHN GILL.